W. B. POTTER.
SYSTEM FOR PREVENTING ELECTROLYSIS.
APPLICATION FILED FEB. 20, 1915.

1,191,611. Patented July 18, 1916.

Witnesses:
Earl G. Klock.
J. Ellis Glen.

Inventor:
William B. Potter,
by Albert G. Davis
His Attorney

UNITED STATES PATENT OFFICE.

WILLIAM B. POTTER, OF SCHENECTADY, NEW YORK, ASSIGNOR TO GENERAL ELECTRIC COMPANY, A CORPORATION OF NEW YORK.

SYSTEM FOR PREVENTING ELECTROLYSIS.

1,191,611. Specification of Letters Patent. Patented July 18, 1916.

Application filed February 20, 1915. Serial No. 9,547.

*To all whom it may concern:*

Be it known that I, WILLIAM B. POTTER, a citizen of the United States, residing at Schenectady, county of Schenectady, State of New York, have invented certain new and useful Improvements in Systems for Preventing Electrolysis, of which the following is a specification.

My invention relates to a system for preventing electrolysis, and more particularly to the application of such a system to electric railways.

Where the rails of an electric railway are used as return conductors, it is frequently found that stray currents escape from the rail to ground and thence to earthed metallic structures, such as water or gas pipes. These escaping currents will enter the pipes at points remote from the powerhouse, where the rails are positive to the pipes, and travel therein until, at points near the power-house, the pipes become positive to the rails. Current will then leave the pipes and pass back into the rail. Wherever current leaves the pipes, an electrolytic corrosion is caused, which often seriously damages the pipes.

It has been previously proposed, in those systems where both positive and negative insulated feeders are employed, to insert a series booster in the negative feeder and to excite the booster field with a current proportional to that flowing in the corresponding positive feeder. As will be evident, however, the successful operation of such an arrangement presupposes that the current returning from any one point corresponds with the current sent out over the related positive feeder, whereas in a complex system it is unlikely that such a relation will exist.

The object of my invention, then, is to devise a system whereby the potential difference between the rails and adjacent pipes will be minimized and this relation maintained throughout all conditions of operation.

In the appended claims I have definitely pointed out the novel features characteristic of my invention.

The details of construction and arrangement and the mode of operation of my system are more fully described in the following specification when taken in connection with the accompanying drawing, in which—

Figure 1:
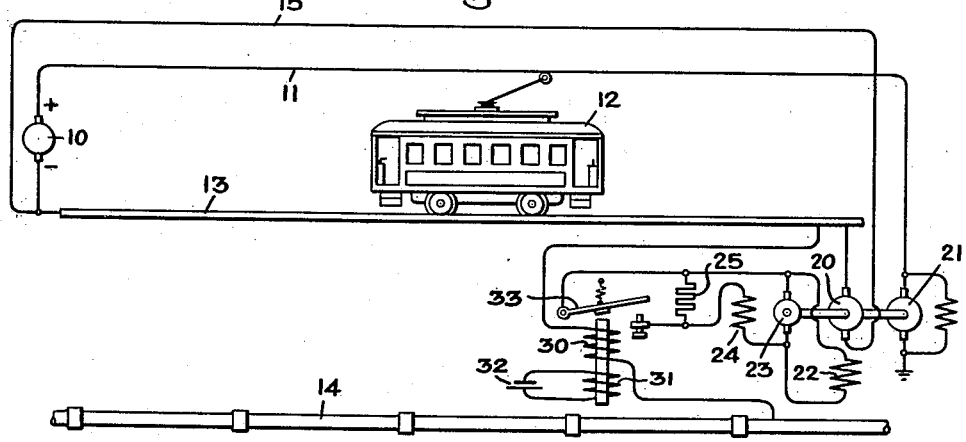
Figure 2:
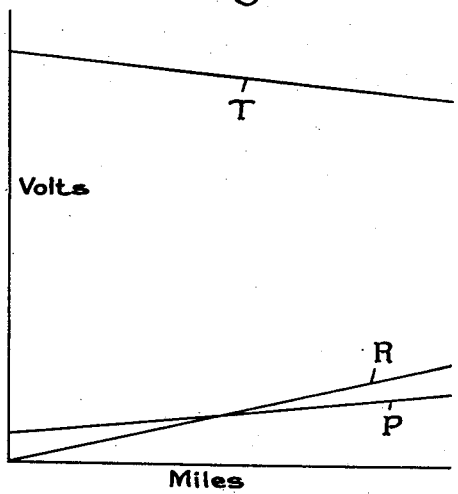

Figure 1 is a diagrammatic view illustrating my system applied to an electric railway. Fig. 2 is a diagram showing the relative potential of the various conductors throughout the length of the line before the application of my system while Fig. 3 is a similar diagram showing the conditions obtained after its use.

In the simplified case herein illustrated, power is supplied from the generator 10 through the trolley 11 to the electric car 12, and returns to the generator through the rails 13, only one of which is shown. Adjacent the rails is a pipe system 14, which may represent a gas or water main, extending more or less parallel to the tracks from a point remote to the generator to a point near the generator. Connected to the negative terminal of the generator and to a point near the end of the track is a feeder 15 preferably insulated from ground, and in series with this feeder is the armature of a booster 20. Although I have shown the booster located near the end of the track this location is not essential. This machine is driven in any desired manner, and it is here shown as mounted on the same shaft with a motor 21 supplied with current from the trolley. The field 22 of the booster is separately excited by means of an exciter 23, here shown as direct connected to the booster set. In series with the field winding 24 of the exciter is a resistance 25. A regulator is then supplied to control the field of the exciter in accordance with the potential difference between the track and the pipes. This regulator comprises a coil 30 connected between said points and responsive to variations of the potential difference. In addition a coil 31, excited from a source of constant voltage such as the battery 32, is arranged to produce a flux which will be added to or subtracted from the flux produced by the coil 30 according to the relative direction of the currents therein. A spring held pivoted armature 33 is arranged, when attracted by the flux produced by the coils 30 and 31, to short circuit the resistance 25 in series with the exciter field.

Figure 3:
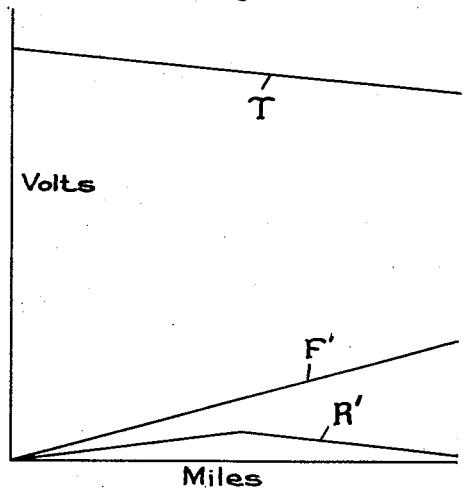

Conditions before the application of my system have been illustrated in Fig. 2, whereas the conditions obtained by the use of my system are shown in Fig. 3. The ordinates represent voltages, considering the negative terminal of the generator as zero, while the abscissæ represent distances away from the generator in miles. In either case the potential gradient of the trolley is shown at T. When uncorrected, as in Fig. 2, the potential gradient R of the rails starts at the negative terminal of the generator and gradually increases to the outer end of the line. Similarly, the gradient P of the pipe system gradually rises, but it will be noted that at points near the end of the line, the rails are positive to the pipes, whereas at points near the generator the pipes are positive to the rails. It, therefore, follows that there is a flow of current into the pipes at their outer ends and out of the pipes at points near the generator. Electrolytic corrosion will accordingly result at the latter points.

It will readily be seen that if I can reduce the potential difference between various points in the rails, that there will be a less tendency for stray currents to leave the rails to pass through the ground and pipes. I have, accordingly, supplied a so-called "negative" feeder, connected to the negative terminal of the generator and by the introduction of an electromotive force at some point therein, as for instance at its outer end, I so raise the potential at this point, as shown by $F^1$ in Fig. 3, that a considerable portion of the current returned to the power-house is forced through this feeder. If properly regulated, the resulting potential gradient of the rails will assume a form such as that shown at $R^1$ in Fig. 3, from which it will be seen that the point of highest potential in the rails is now intermediate the generator and the extreme end, and at the same time, is markedly reduced from its potential without the use of my system. Furthermore, the potential difference between the rails and the pipes, whose potential gradient may now be considered as coinciding with the base line at the extreme end of the line is minimized, and may, by adjustment of the battery 32, be brought to zero or reversed. If brought to zero, a current flow from intermediate points of the rails toward both the generator and the outer end would result. If, now, the load conditions are such that the electromotive force introduced by the booster is insufficient to force the desired amount of current through the negative feeder so that the potential difference between the rails and pipes is not reduced to zero, then the solenoid 30 of the regulator will be energized, and if the potential difference is sufficiently great, the armature 33 will be attracted, thus short circuiting the resistance 25 and increasing the current in the field winding 22 of the booster. The booster potential will thereby be increased, and a larger amount of current will be forced through the negative feeder, being taken out of the rails and forced into the negative feeder. As soon as the potential difference between the rails and the pipes has been reduced, the armature 33 will be released and the resistance 25 reinserted in the exciter field circuit. This action will be rapidly repeated with the regulating effect common to regulators of this type.

It will be understood that while for the sake of this application I have shown the simplest form of electric railway system, it will, nevertheless, hold that, however complex the system, the use of the apparatus which I have described will result in maintaining an approximately zero difference of potential between the rails and pipes at remote points, and in forcing current through the negative feeder. I have therefore accomplished the desired result. It will of course be understood by those skilled in the art that, although I have herein illustrated and described my invention as applied to an electric railway using direct current for the prevention of electrolysis, the principle thereof is equally applicable to a system using alternating current for the purpose of neutralizing inductive disturbances in neighboring telephone or telegraph conductors.

Although I have herein shown and described one preferred form of apparatus which may be used to carry into effect my invention, I wish it understood that similar results can be obtained by the use of equivalent apparatus, and I, therefore, seek to cover in the appended claims all those modifications and equivalents which are within the scope and spirit of my invention.

What I claim as new and desire to secure by Letters Patent of the United States, is:—

1. In combination an electric railway system comprising a plurality of return conductors, one of which is in contact with the ground and another of which is insulated from the ground, an adjacent earthed metallic structure, a source of E. M. F. in series with said insulated conductor, and means for controlling said source responsive to the potential difference between the conductor in contact with the ground and said earthed structure.

2. In combination an electric railway system comprising a plurality of return conductors, one of which is in contact with the ground and another of which is insulated from the ground, an adjacent earthed metallic structure, a source of E. M. F. in series with said insulated conductor, and means for controlling said source comprising a coil responsive to the potential difference between the conductor in contact with the ground and said earthed structure and a separately excited coil.

3. In combination an electric railway system comprising a plurality of return conductors, one of which is in contact with the ground and another of which is insulated from the ground, an adjacent earthed metallic structure, a source of E. M. F. in series with said insulated conductor, and means for controlling said source comprising electrically independent coils, one of which is excited from a source of approximately constant voltage and the other of which is responsive to the potential difference between the conductor in contact with the ground and said earthed structure.

4. In combination an electric railway system comprising a supply generator, a trolley conductor insulated from ground, a rail connected as a return conductor, an adjacent earthed metallic structure, a negative feeder connected between the negative terminal of said generator and a remote point in said rail and insulated from ground at all intermediate points, a booster in series with said feeder to aid the flow of current therein, and means for regulating the voltage of said booster in response to the potential difference between said rail near its connection to said feeder and said earthed structure.

In witness whereof, I have hereunto set my hand this 17th day of February, 1915.

WILLIAM B. POTTER.

Witnesses:
EDITH L. GERMOND,
BENJAMIN B. HULL.